INVENTORS
MAKSYMILIAN A. MICHALSKI
ROBERT A. FLIEDER
BY
ATTORNEY

Aug. 11, 1970   M. A. MICHALSKI ET AL   3,524,102
SOLID STATE MEANS FOR GAS DISCHARGE LAMP
Filed Feb. 10, 1966   3 Sheets-Sheet 3
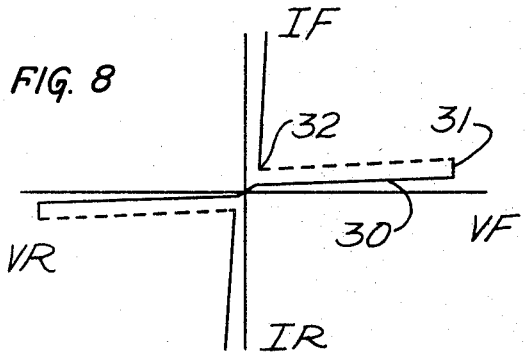
FIG. 8
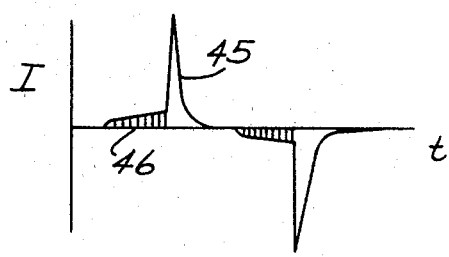
FIG. 14
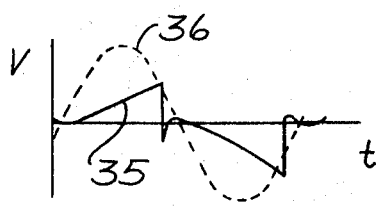
FIG. 9
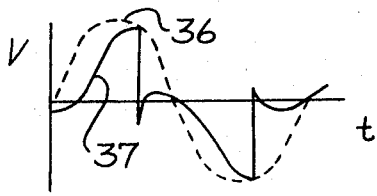
FIG. 10
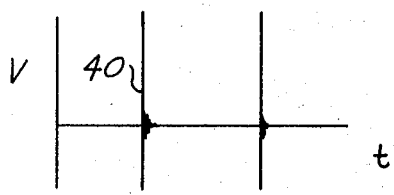
FIG. 15
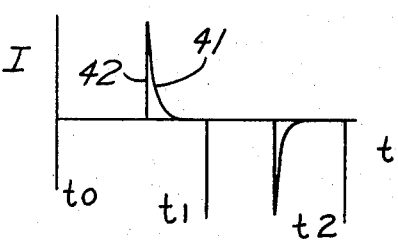
FIG. 16
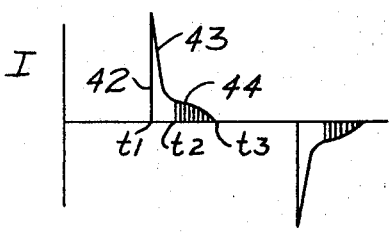
FIG. 11
FIG. 12
FIG. 13
FIG. 17
INVENTORS
MAKSYMILIAN A. MICHALSKI
ROBERT A. FLIEDER
BY
ATTORNEY

United States Patent Office 3,524,102
Patented Aug. 11, 1970

1

3,524,102
SOLID STATE MEANS FOR GAS DISCHARGE LAMP
Maksymilian A. Michalski, Woodside, N.Y., and Robert A. Flieder, Fords, N.J., assignors to Berkey Photo, Inc., New York, N.Y.
Filed Feb. 10, 1966, Ser. No. 526,440
Int. Cl. H05b 37/00, 39/00
U.S. Cl. 315—238                             16 Claims

ABSTRACT OF THE DISCLOSURE

Gas discharge lamp operated by solid state switching means connecting capacitor to the discharge lamp in series with impedance to alternating current line.

---

The present invention relates to an improved electric system including an electric discharge lamp and its operating circuit.

Heretofore, pulsed operation of discharge lamps has been provided by operating systems incorporating saturable reactors providing pulsed waveforms for the discharge lamps. Such a system has been described by one of the applicants herein, Maksymilian A. Michalski, in his U.S. Pat. No. 3,174,076 issued Mar. 16, 1965, and titled "Electric System for Discharge Device Utilizing Resonant Circuit to Provide Constant Current Output." This system has had excellent commercial acceptability.

The discharge lamps are generally formed of elongated quartz envelopes provided with self heating electrodes at opposite ends, Generally the lamps are filled with xenon gas at a pressure about atmospheric or greater. Other noble gases may be used for the lamp such as helium, neon, argon, or krypton. Also mercury or other additives may be introduced into the envelope with one or more of these gases. Xenon gas filling is used extensively because a lamp so filled has the greatest luminous efficiency and because the light produced is very similar in its spectrum to daylight, thus it is suitable for the graphic arts, for photographic applications, and for general illumination. The electrodes of the lamps are made of tungsten with an activated or thoriated construction in which the tip of the electrode is encircled by a coil, the space between the tip and the coil being filled with an activating material.

In the xenon lamp the peak intensity of the components of the emitted light is reached first by blue, then by green, and finally the tail of the flash is wholly red. The color of a particular xenon lamp depends to some extent upon the magnitude of the capacitance discharged therethrough, upon the voltage, and to a large extent upon the waveform of the discharge current.

The luminous efficiency of a xenon filled lamp is to a certain degree a function of the lamp loading. The luminous efficiency is low for undervoltage operation, yet overvoltage operation may result in damage to the lamp. Further, good luminous efficiency depends upon tube parameters and upon the use of an appropriate capacitance and voltage for a particular lamp without exceeding the maximum loading which the lamp will safely withstand.

The overall operating efficiency of the xenon filled lamp is greater than the operating efficiency of incandescent lamps. For example the incandescent lamp has an efficiency of from 10 to 24 lumens per watt, while the xenon

2 lamp has an efficiency ranging from 25 to 50 lumens per watt, yet more than 90 percent of the available energy in a xenon flash is wasted in heat. It is apparent that a slight increase in luminous efficiency results in a considerable gain in the overall efficiency of operation of the lamp.

The present invention aims to provide an improved system with greater luminous and operating efficiency.

In accordance with the present invention an electric system is provided including a discharge lamp and an operating circuit incorporating a capacitor and solid state switching means for discharging the capacitor through the discharge lamp so that the discharge current pulse has a high rate rise time and a more highly peaked waveform than that heretofore produced.

The system in accordance with the invention is advantageous in that it may be readily controlled so as to have better regulation of the light output. The electrical operation is more efficient because there is less heat produced because of reduced switching losses. There is less audible noise because of the elimination of the core of the saturable reactor. The system is compact and inexpensive to manufacture. The color temperature of the light is more towards blue than towards red as is desired for certain applications.

Another object of the invention is to provide an electric system incorporating a discharge lamp which is simple and economical in manufacture, efficient in operation, and rugged in use.

Other objects and advantages of the invention will be apparent from the following description and from the accompanying drawings which show, by way of examples, embodiments of the invention.

In the drawings:

FIG. 8 shows a current voltage characteristic of the switching means.

FIG. 9 shows a waveform of capacitor voltage switched late in the cycle of the supply frequency, the waveform of the supply frequency being shown in dashed lines.

FIG. 10 shows a capacitor voltage waveform corresponding to that shown in FIG. 9 but switched earlier in the cycle.

FIG. 11 shows a waveform of the starting pulse.

FIG. 12 shows a waveform of the current pulse through the discharge lamp for a parallel connected capacitor.

FIG. 13 shows a lamp current waveform corresponding to the waveform of FIG. 12 but with a lower impedance charging circuit.

FIG. 14 shows a lamp current waveform with a series connected capacitor as shown in FIG. 4.

FIG. 15 shows the lamp current waveform of FIG. 12 at an expanded scale.

FIG. 16 shows a lamp current waveform at the same scale as the waveform of FIG. 15 but utilizing a prior art circuit.

FIG. 17 shows a sinusoidal supply voltage waveform with its time scale marked in degrees.

Figure 1:
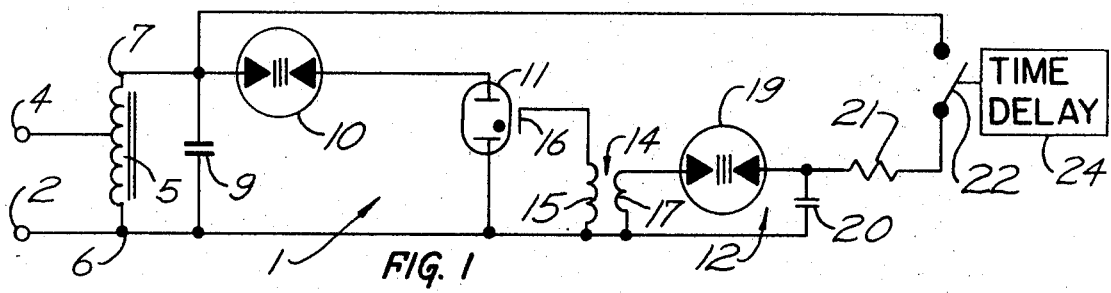
FIG. 1 is a schematic diagram of an electric system in accordance with the invention incorporating a starting circuit in which starting pulses are applied to a third electrode of the discharge lamp through a pulse transformer.

Referring to the drawings there is shown in FIG. 1 an electric system 1 in accordance with the invention. The system 1 is supplied from an alternating current source to input terminals 2 and 4 of an autotransformer 5 having output terminals 6 and 7. A main capacitor 9 is connected across the output terminals 6 and 7 of the autotransformer 5. A solid state switching device 10 is connected between one terminal of the capacitor 9 and one terminal of a gas discharge lamp 11. The other terminal of the capacitor 9 is directly connected to the other terminal of the lamp 11.

Starting means for the electric system may be of any suitable form for ionizing the gas in the discharge lamp 7. Because of the high rate rise time of the current waveform, the discharge lamp flashes more readily, therefore the starting means for the circuits shown herein may be of less wattage than has been heretofore used. In one form of the starting circuit 12 a starting transformer 14 has its secondary 15 connected to a third electrode 16 of the lamp 11. Primary 17 is connected through a switching diode 19 across a capacitor 20. One side of the primary 17 and one side of the capacitor 20 are connected to the autotransformer output terminal 6, the other side of the capacitor 20 being connected through a current limiting impedance such as resistor 21 and a starting switch 22 to the autotransformer output terminal 7. The starting switch 22 may be operated by a time delay mechanism 24, or as appears later, the starting switch 22 and the time delay mechanism 24 may be omitted.

The starting circuit 12 may have its components so chosen that for some applications there may be one to three, or even more high frequency pulses produced during each half cycle of the supply. However, the timing of a plurality of pulses may vary somewhat as because of disturbances in the supply current waveform such as because of variations due to temperature changes, magnetic fields, etc. If precise control of starting is desired more accurate timing of the pulse may be more readily achieved with a circuit designed to produce a single high frequency pulse during each half cycle.

The autotransformer 5 is used to raise the line voltage to a more appropriate value for efficient operation of the discharge lamp 7 and in addition provide impedance to prevent or minimize line voltage dip upon the discharge of the capacitor 4. The impedance of the autotransformer 5 also limits current flow into the capacitor 9 during the portion of the cycle after the peak discharge of the lamp 11, thus preventing current flow into the capacitor 9 which would continue to discharge through the lamp 11 resulting in inefficient light output and in the production of heat in the discharge lamp.

The capacitor 9 should have the desired capacitance for the storage of energy for the peak discharge into the lamp 11. The capacitor 9 may be of the metallized paper, Mylar, or oil impregnated type.

The solid state switching device 10 is a thyristor either with or without gate control such as a switching diode, controlled rectifier or the like, and capable of passing current in both directions for operation on an alternating current waveform. A satisfactory bidirectional thyristor, also called a switching diode, has been found to be the PD–135 made by the Hunt Electronics Company of Dallas, Tex. The nominal forward and reverse breakover voltage of this thyristor is 225 volts. If desired two thyristors may be connected in series to provide a desired breakover voltage of 450 volts. In some instances it may be desirable to use two thyristors of lower voltage rather than one thyristor of an appropriate voltage in order to take advantage of the inherent spread of the characteristics and a lower cost.

The discharge lamp 11 may be of any suitable type and may be of any desired wattage from 300 to 8000 watts. Circuit constants have been herein set out for a 1400 watt lamp. The PD–135 thyristor will carry about 1400 watts, and the other circuit constants for a 1400 watt discharge lamp may be selected as will be hereafter discussed more fully.

The pulse transformer 14 may be of the type having an air, or other siutable core such as will pass pulses in which the frequency of the oscillation may be of the order of about 30 to 100 kilocycles, or even up to about one megacycle or more. The step up voltage ratio of this transformer is such that the secondary voltage is of the order of one to five thousand volts.

The starting circuit thyristor 19 may be similar to the switching means 10 but probably of lower breakover voltage and of lower current capacity. The triggering transformer 14 and the current limiting impedance or resistance 21 are selected for suitable operation. The starting circuit switch 22 may be operated by the time delay 24 set to operate for two to five seconds.

In the operation of the electric system 1 of FIG. 1 capacitor 20 is charged to the voltage of capacitor 9 through the impedance 21. The constants of the capacitor 20 and of the impedance 21 are so selected that the switching diode 19 will conduct when the breakover voltage of the switching diode is reached which may be one or more times during each half cycle of the alternating current supply. Upon conduction of the diode 19 the capacitor 20 is discharged through the primary 17 of pulse transformer 14 so as to produce a pulse through the third electrode 16 of the discharge lamp 11. This pulse ionizes the gas in the lamp and permits voltage to be applied across the thyristor 10. When the voltage across the thyristor 10 reaches its breakover voltage it conducts and discharges the main capacitor 9 through the lamp 11 producing a flash of light. After a few seconds of discharges the electrodes of the lamp are sufficiently heated to maintain thermal emission of the electrodes and the time delay 24 opens the starting switch 22 disconnecting the starting circuit 12. The operating circuit 1 continues in operation, the thyristor 10 switching the capacitor for discharge into the lamp 11 at least once per half cycle at the time when the capacitor voltage exceeds the breakover voltage of the thyristor 10. Thus for a 60 cycle supply, the lamp 11 is discharged at least 120 times per second producing to the eye of an observer a continuously burning light.

The operation of the electric system 1 perhaps may be more readily understood by referring to the waveforms of FIGS. 8, through 17.

FIG. 8 shows a volt ampere characteristic generally exemplary of the operation of the thyristors 10 and 19.

It will be noted that with an increase in voltage a small forward current 30 flows until a voltage indicated at 31 is reached at which time the forward current increases somewhat and breakover occurs. The voltage across the thyristor drops to the point 32 and only slightly increases thereafter even with an increase in the forward current. The same conditions are obtained for conduction in the reverse direction. The bidirectional diode has the switching characteristics of a pair of controlled rectifiers connected in opposed parallel relationship or of a gate controlled five layer thyristor. It can be turned on in neither direction by applying a voltage pulse across it having an amplitude greater than its breakover voltage. After being turned on it continues to conduct until the current through it drops below its minimum holding current. In the case of the gate controlled thyristor a signal applied to the gate triggers the thyristor into conduction.

In FIG. 9 there is shown a waveform 35 of the capacitor 9 voltage, the line voltage being shown in dashed line 36. It will be noted that the capacitor has been discharged late in the period of the half cycle.

FIG. 10 illustrates a waveform similar to that shown in FIG. 9 but in which the capacitor has been discharged earlier in the half cycle. The capacitor 9 voltage is shown by the waveform 37.

FIG. 11 shows a starting pulse produced by the starting circuit 12 the pulse being a damped oscillatory waveform 40. Although a single starting pulse 40 is shown, by appropriate selection of the constants of the starting circuit capacitor 20, impedance 22 and breakover voltage of the thyristor 19, a plurality of damped oscillatory waveforms may be obtained for each cycle of the operating voltage.

FIG. 12 shows a waveform 41 of the current through the discharge lamp 11. Attention is called to the high rate rise time ($di/dt$) of leading edge 42 of the waveform 41 which has a slope approaching infinity. The holdover current is of a very small value indicating that the capacitor charging circuit impedance is high.

In FIG. 13 there is shown a lamp current waveform 43 corresponding to the lamp current waveform 41 but with a trailing edge 44 of higher value. The waveform 43 is typical of that produced by a low value capacitor charging impedance. While it is desirable that the capacitor charging impedance be so selected that the value of holdover current be limited to a minimum after flash in order that the operation may be most efficient, it may be necessary, in some cases, to have some holdover current flowing through the lamp 11 to maintain ionization so that the lamp will flash during the next half cycle. Ionization of the lamp between pulse discharges is maintained by the holdover current together with thermal emission of electrons in the discharge lamp.

Referring again to FIG. 13 it will be noted that flash over occurs at $t_1$, flash discharge flowing from $t_1$ to $t_2$ and holdover current flowing from $t_2$ to $t_3$.

FIG. 14 shows a lamp current waveform 45 for the electric system 65 (FIG. 4) in which the main capacitor 67 is series connected. The capacitor charging current before conduction of the diode 10 is indicated at 46.

FIG. 15 shows the waveform 41 at an enlarged scale from an oscillograph made during the operation of the electric system 1. The high peak together with the high rate rise time of the leading edge 42 of the discharge current waveform 41 produce the excellent wattage and luminosity efficiency of the electric system in accordance with the invention.

FIG. 16 shows a waveform 47 corresponding to and at the same scale as waveform 41 for the electric system 1 of FIG. 1 modified by utilizing a saturable reactor as described in the Michalski Pat. 3,174,076 in place of the thyristor 10. It will be noted that the waveform 47 shows that the prior circuit draws a magnetizing current as indicated at 48 before the comparatively slow rate rise 49 and a trailing magnetizing and holdover current 50. The lower rate of rise time of the waveform 47 may be explained by the fact that the saturable reactor of the prior art system has a saturated impedance significantly higher than that of the solid state device of the present invention. The holdover current of a 1400 watt lamp is about one ampere.

FIG. 17 shows a sinusoidal waveform 51 with its time scale indicated in degrees. Good efficiency is achieved by operation between 75 and 105 degrees of the half cycle. If the thyristor conducts between 0 to 75 and between 105 to 180 degrees operation may be inefficient.

Figure 2:
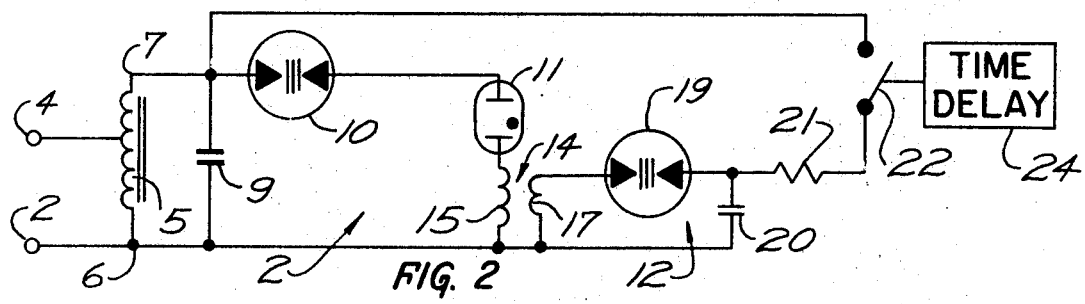
FIG. 2 shows a modified electric system corresponding to FIG. 1 but in which the starting pulses are applied to the discharge lamp through a pulse transformer having a winding connected in series with the discharge lamp and in which the starting pulses pass in series through the switching diode and the discharge lamp.

In electric system 2 of FIG. 2 the starting pulse is applied across both the thyristor 10 and the discharge tube 11. The transformer secondary 15 is connected in series with the discharge lamp 11. Inasmuch as the starting pulse is much higher than the breakover voltage of the thyristor 10, the thyristor is triggered into conduction and the discharge lamp is ionized at the same time.

In this circuit while the starting circuit is in operation there may be variations in the light output in that the lamp may be triggered at an undesirable angular position of the sine wave of the alternating current cycle at which time the capacitor 4 may not be sufficiently charged, or may be on its discharge portion of the cycle. This may result in flicker or uneven light output during the time that the starting circuit is in operation. Of course, after the starting circuit has been turned off by the time delay 24 the operation would be satisfactory.

Any flicker which might occur would be objectionable only for short exposures of, for example, 4 seconds in length. The flicker occurs because the starting pulse breaks down both the lamp and the thyristor at the beginning of or towards the end of the half cycle at which time the main capacitor is at low voltage which would result in a low peak value current discharge. Because of the control of the thyristor by the high frequency pulse the capacitor is discharged even though it is not sufficiently charged for high peak value current discharge and while its voltage is so low that the thyristor would not have been triggered by the capacitor voltage. Operation with the low peak value discharge current would be inefficient. In order to eliminate this deficiency a by-pass capacitor can be provided so that the starting pulses do not go through the thyristor and the discharge is controlled by the breakover voltage of the thyristor. Such an electrical system is shown in FIG. 3.

Figure 3:
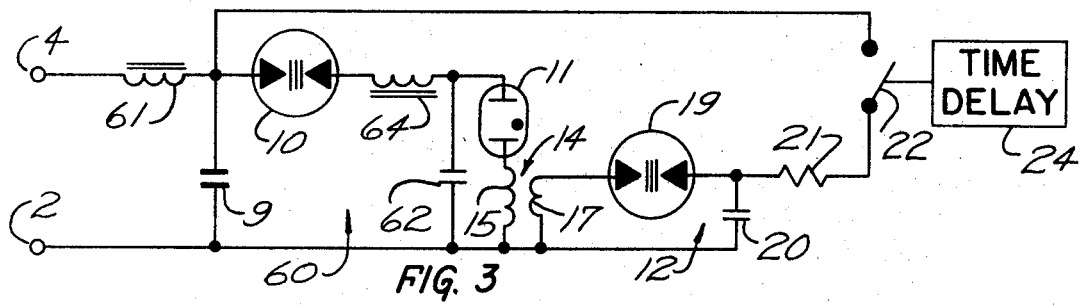
FIG. 3 shows the electric system of FIG. 2 modified for a direct connection to a line substituting a current limiting impedance for the voltage step up autotransformer. In addition, a by-pass capacitor and choke are provided to block the starting pulses from the switching diode.

An electric system 60 shown in FIG. 3 corresponds to the electric system 1 modified in that the step up autotransformer 5 has been omitted as might be the case if the supply voltage were of the necessary magnitude for direct efficient operation of the discharge lamp 11. In the electric system 60 a current limiting impedance 61 is used to limit the line current and to prevent disturbance on the supply line by the operation of the discharge lamp 11. The impedance 61 is equivalent to the impedance of the autotransformer 5. The starting circuit 12 used in this system is the same and coupled as in FIG. 2. In addition, in the electric system 60 a by-pass capacitor 62 is used to divert the high frequency starting pulses so that they are not passed through the thyristor 10. In addition, if desired, a blocking inductance 64 may be connected in series between the thyristor 10 and the lamp 11. The electric system 60 operates in the same manner as the electric system 1 of FIG. 1 in that the starting pulses are not passed through the thyristor, but the third electrode 16 for the discharge lamp 11 is not required.

Figure 4:
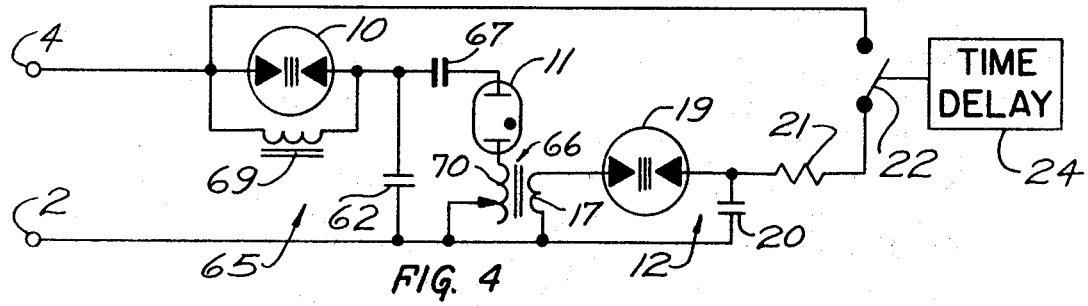
FIG. 4 shows an electric system in which the autotransformer is omitted, the capacitor being series connected with the discharge lamp and a by-pass capacitor is utilized to block starting pulses from the switching diode.

An electric system 65 is shown in FIG. 4 in which the autotransformer 5 or impedance 61 of FIGS. 1–3 are omitted and in which current limiting impedance is provided by a combination choke and pulse transformer 66. The main capacitor 67 is connected in series with the thyristor 10, the lamp 11 and the combination choke and pulse transformer 66 across the alternating current supply line. An impedance 69 is connected in parallel with the switching diode 10 to provide charging current for the main capacitor 67 during the period before the thyristor 10 becomes conducting. The combination choke and pulse transformer 66 is provided with tapped secondary 70 to accommodate alternating current supplies of different voltages.

In the electric system 65 as in FIG. 3 the by-pass capacitor 62 is connected across the supply on the load side of the thyristor 10 so that the high frequency starting pulses are diverted from the thyristor 10 and thus the thyristor becomes triggered into conduction only when the voltage across its terminals exceeds its breakover voltage. The electric system 65 may be advantageous over systems using a parallel connected main capacitor in that the components for the series connected capacitor system may be somewhat less expensive. However, in the electric system 65 the capacitor charging current must pass through the discharge lamp, thus the wattage drawn by the lamp increases proportionately to the output which might result in a lower overall luminous efficiency.

Figure 5:
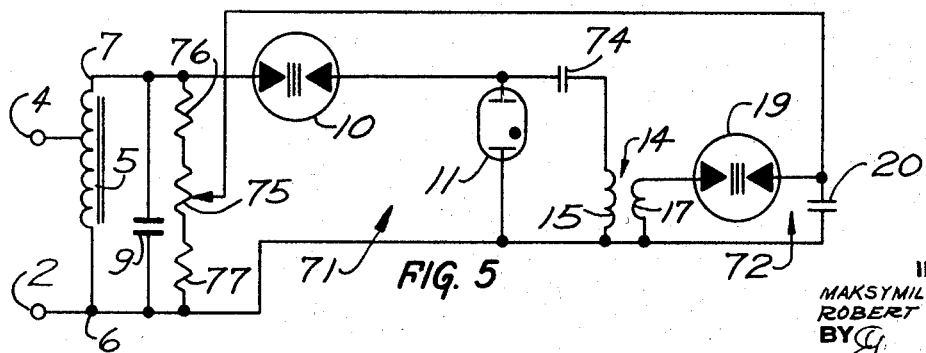
FIG. 5 shows the operating circuit of FIG. 2 modified by a capacitance coupled starting circuit, and in which triggering potential for the starting circuit is obtained from a potentiometer.

In electric system 71 of FIG. 5 the starting and control circuit 72 is continuously operative and the high frequency starting pulses are applied to both the discharge lamp 11 and to the thyristor 10 as in FIG. 2. The starting and control circuit 72 is similar to the starting circuit 12 excepting that the secondary of pulse transformer 14 is capacitively connected to the discharge lamp 11 by a capacitor 74. This circuit 72 is adapted to be continuously operated and to supply control pulses for each one half cycle discharge. In the circuit 72 it is preferable to select the constants so that there is only one high frequency pulse produced for each half cycle. The starting and control circuit 72 is controlled by a potentiometer 75 connected in series with resistors 76 and 77 across the main capacitor 9. By adjustment of the potentiometer 75 the timing of the discharge pulse is variable in phase position. For proper operation of this circuit the thyristor 10 must be chosen with a breakover voltage higher than the capacitor voltage so that the triggering control of the discharge current is achieved by the high frequency pulse from the starting and control circuit. In the electric system 71 the high frequency pulse acts as a starting and control pulse. The electric system 71 is advantageous in that its operation is quite efficient because the capacitor charging circuit may be so designed that no holdover current flows between pulses, the lamp being ionized and the thyristor switched each half cycle by the high frequency control pulse.

Figure 6:
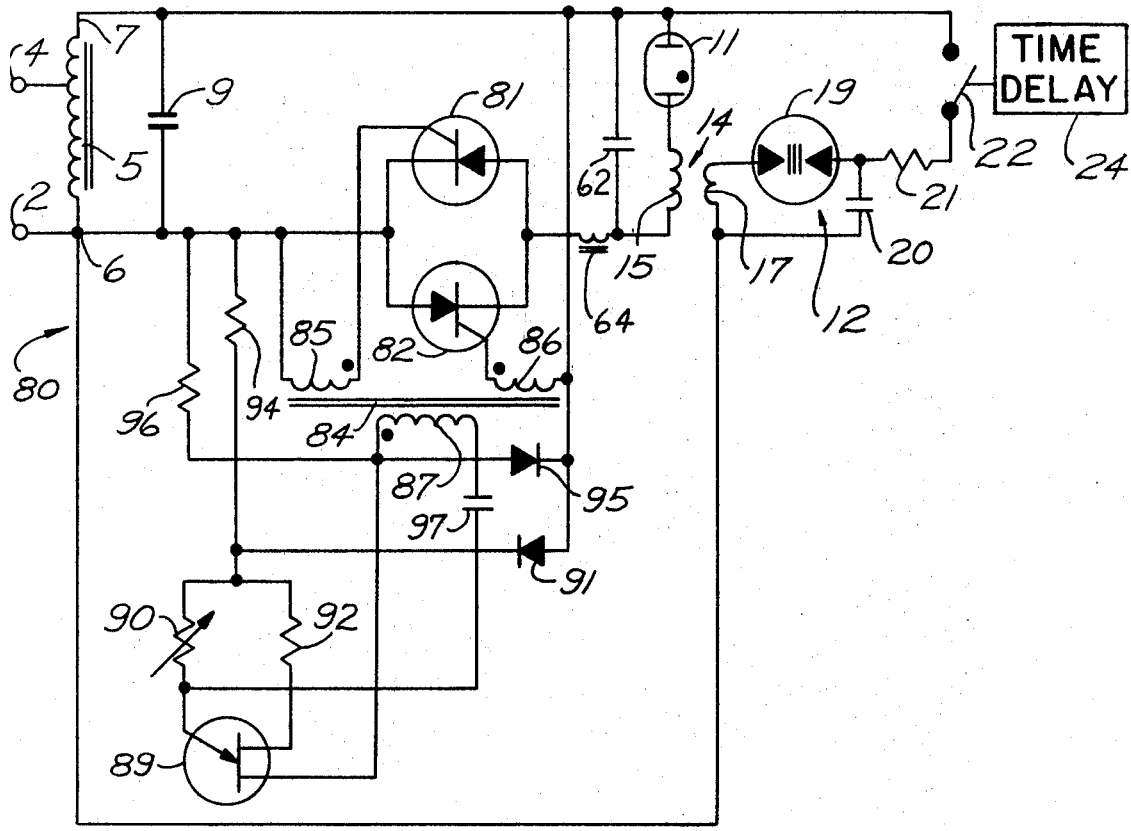
FIG. 6 shows an electric system similar to FIG. 2 but in which the switching diodes have been replaced with a pair of opposed parallel connected controlled rectifiers. A by-pass capacitor diverts the starting pulses from the controlled rectifiers and adjustable phase control means is provided for the controlled rectifiers for varying the light output.

FIG. 6 shows an electric system 80 in which the thyristor 10 of the electric systems of FIGS. 1–5 is replaced with a pair of opposed silicon controlled rectifiers 81 and 82. The silicon controlled rectifiers are conventionally controlled by a pulse transformer 84 having windings 85 and 86 connected to their gates. Center winding 87 of the pulse transformer 84 is driven by unijunction transistor 89. The emitter of the unijunction transistor 89 is connected through a potentiometer 90 to a diode 91 and to a voltage dropping resistor 94. One base of the unijunction transistor 89 is connected through a resistor 92 to a diode 91 and to the voltage dropping resistor 94. The other base is connected to the anode of a diode 95 and to another voltage dropping resistor 96. A capacitor 97 is connected between the emitter of unijunction 89 and one end of the center winding 87, the other end of the winding 87 being connected to the anode of diode 95.

If desired a starting pulse blocking inductance 64 may be placed in the circuit after the controlled rectifiers 81 and 82 and before the by-pass capacitor 62.

In the operation of the electric system 80 the starting circuit 12 produces high frequency pulses to ionize the lamp 11. At such time as the potentiometer 90 controls the firing of the controlled rectifiers 81 and 82 the capacitor 9 is discharged through the controlled rectifiers and the discharge lamp 11. The illumination produced by the discharge lamp 11 during the starting period of the electric system 12 is very stable as the discharge pulses are controlled by the controlled rectifiers irrespective of the timing of the high frequency starting pulses. In this system the capacitor charging impedance must be such that sufficient holding current flows between main capacitor discharge pulses to maintain the discharge lamp 11 in ionized condition.

Figure 7:
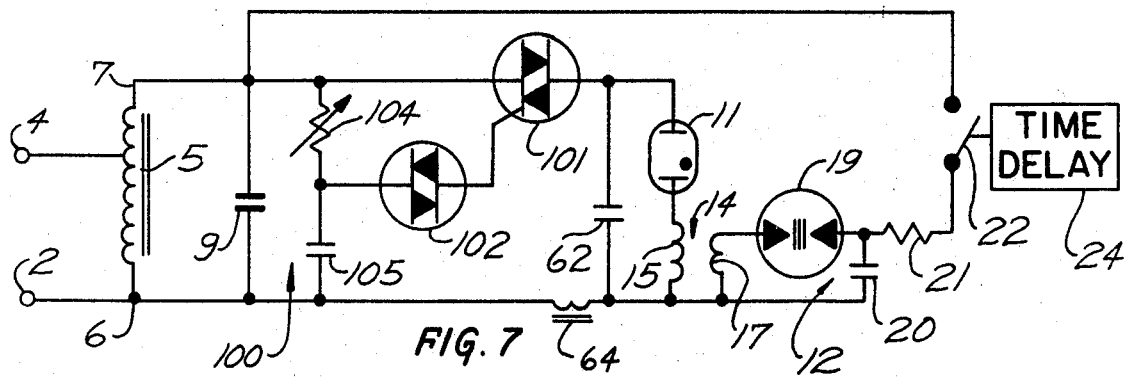
FIG. 7 shows an electric system according to FIG. 6 but in which the controlled rectifiers have been replaced with a gate controlled solid state switching means adjustably phase controlled for variation in the light output.

FIG. 7 shows an electric system 100 similar to the electric system 80 of FIG. 6 but in which the controlled rectifiers 81 and 82 are replaced by a gate controlled thyristor such as a Triac 101. A transformer coupled starting circuit 12 is used. The Trica 101 is controlled by a Diac 102 phase controlled by a potentiometer 104 and a capacitor 105 connected in series across the capacitor 9. In the electric system 100 the high frequency starting pulses are bypassed by the by-pass capacitor 62 and, if desired, the inductance 64 may be connected as shown. Starting and operation of the electric system 100 is similar to that of the electric system 80 of FIG. 6.

From the foregoing it will be seen that the electric systems of FIGS. 1 through 4 are operative in a manner depending upon the constants of the system components. These components may be selected for operation anywhere in the half cycle but preferably between 75 and 105 degrees of the half cycle. In the electric systems of FIGS. 2, 3 and 4 the starting circuit 12 might be replaced by the phase controlled starting and control circuit 72 of FIG. 5 which might still further be modified by replacing the potentiometer with the R-C control as used for the thyristor 102 of FIG. 7. In this event the blocking inductance 64 and the by-pass capacitor 62 of FIG. 3 would be removed. In FIG. 4 the by-pass capacitor 62 of the circuit 65 would be placed ahead of the thyristor 10 so that the starting and control pulses pass through both the discharge lamp and the thyristor. Also with such modifications to the electric systems 2, 60 and 65 of FIGS. 2, 3 and 4, the starting switch 22 and the time delay 24 would be omitted.

For good operation, the electric system of FIG. 5 and the suggested modifications above for the electric systems of FIGS. 2, 3 and 4 providing phase control, must have a thyristor selected with a higher breakover voltage than the capacitor voltage so that the thyristor does not break over by the capacitor voltage. The triggering of both the thyristor and the discharge lamp would be by the high frequency pulses. In electric systems so arranged the light output would be controlled.

In using the circuits arranged for control of the triggering of the thyristor and lamp at the same time flickering at the start of the operation is prevented. In the use of a higher pressure lamp and with a thyristor having a large value of holding current the lamp may completely deionize or shut off at the end of each half cycle. In this case it is advantageous that the circuit be arranged so that both the thyristor and the tube are triggered at the same time. With the combination starting and control the starting circuit would usually be arranged to provide a single pulse start. However in some applications a multiple high frequency starting pulse might be used. In using the starting circuit without phase control it may be designed to produce one or more pulses per half cycle. In this case the starting circuit is not actually acting as a control in which event it is immaterial whether one or more pulses are provided for each half cycle.

During operation of an electric system with phase control and in which the high frequency pulses are applied to both the thyristor and the lamp in series it may be desirable for greater efficiency to so select the system constants that the thyristor shuts off completely after the main discharge. This would result in a lower line current in that it does not supply a holding current. Of course this will result in lamp shut off and deionization but the high frequency starting pulse for the next half cycle again triggers a flash.

In order to arrive at the constants of the electric system, a discharge lamp 11 of the desired wattage and operating voltage is selected, as for example, 1400 watts with a minimum operating voltage below which the lamp will not fire of 350 volts R.M.S. The stored energy in a capacitor which is available for discharge through the discharge lamp is directly proportional to the capacitance and to the square of the terminal voltage of the capacitor.

Watt second loading=½C (microfarads) E² (kilovolts) per single flash

Lamp watts (60 cycle)=watt seconds×120.

Thus for the selected discharge lamp, the capacitor 9 may have a capacitance of about 60 microfarads. In the event the output voltage of the autotransformer 5 is about 190 volts R.M.S., and with an assumed Q of about 1.8 for the parallel connected capacitor 9 and the autotransformer 5, the reactance of the autotransformer 5 should be about 3.6 ohms. With this reactance the peak voltage of the capacitor 9 is found by multiplying the autotransformer voltage (190 volts R.M.S.) by Q times the square root of 2, or about 480 volts. The most advantageous discharge voltage may be found by experiment at about 450 volts peak.

Using these system constants comparative efficiency tests were made of the electric system of FIG. 1 and a system as shown in Michalski Pat. No. 3,174,076 using a saturable reactor to peak the waveform of the current discharged from the capacitor into the discharge lamp. The results are as follows:

EFFICIENCY COMPARISON TEST, LUMENS PER WATT

|  | Circuit of Figure 1 | Circuit of Patent 3,174,076 | Comparative light output (percent gain) |
|---|---|---|---|
| Lamp watts | 1,400 | 1,400 |  |
| Relative light in foot candles | 10.0 | 9.2 | 8 |
| Relative light in foot candles through blue filter 46b | 10.0 | 9.0 | 10 |
| Peak current through the lamp in amperes | 100 | 55 |  |

From heat loss tests it has been found that the saturable reactor losses range from 200 to 300 watts for a 1400 watt lamp, while the solid state switching losses are only about 20 to 30 watts. Further, there is an additional heat loss in the discharge lamp using the saturable reactor of about 50 watts because of the magnetizing current of the saturable reactor.

It will be noted that there is an 8 percent gain in light output efficiency in lumens output per watt input and there is even a greater gain in blue light of ten percent. It is desirable for certain applications, as for the exposure of some photosensitive materials, that the output be as large as possible in the blue range because of the high actinic quality of blue light.

From the preceding description it will be seen that the present invention provides an electric system which is an improvement over prior devices. Among the advantages of the present construction is that it lends itself to better regulation of light output and control of the firing point. Compensation may be readily made for line voltage variations. The output light level may be adjusted as desired. There is considerably better lumen efficiency and a higher color temperature of the light. Because of the more efficient electric operation there is less load on air conditioning units. The components produce less noise, may be arranged in a more compact manner and are of reduced initial and operating cost.

While the invention has been described and illustrated with reference to specific embodiments thereof, it will be understood that other embodiments may be resorted to without departing from the invention. For example, although the starting circuits have been shown as supplied by the voltage of the main capacitor, in alternative systems the starting circuit might be supplied from the main supply terminals or from a separate alternating current source of the same or of a different waveform. Further, although the electric systems have been described as operative to produce one discharge current pulse during each half cycle of the supply, the system constants may be so selected that more than one discharge pulse may be produced during each half cycle. Still further, while the various electric systems have been shown as coupled to their starting circuits in a particular manner each of the electric systems may be coupled to its starting circuit by any of the described coupling means. Therefore, the form of the invention set out above should be considered as illustrative and not as limiting the scope of the following claims.

We claim:

1. An electric system including a gas discharge lamp of the type operative by an alternating current source, the lamp having a minimum value of flashing current below which flash discharge will not occur, an operating circuit for the discharge lamp including a main circuit current limiting impedance, a main storage capacitor supplied by the source through the current limiting impedance, said capacitor and said current limiting impedance having values proportioned with respect to the characteristics of the discharge lamp so that the charge on the capacitor at the time of discharge during each half cycle of alternation of the supply current produces a current above the minimum value of flashing current below which flash discharge will not occur, starting circuit means supplied by said alternating current source for ionizing the gas in the lamp including triggering capacitor means, transformer step up means, the primary of said transformer connected in series with the lamp, bidirectional solid state switching means, the secondary of said transformer and said triggering capacitor connected in series with said bidirectional solid state switching means, starting circuit current limiting means connected between said triggering capacitor and said source, said triggering capacitor and said starting circuit current limiting impedance forming resistance capacitance phase control means for controlling the triggering of the starting circuit bidirectional solid state switching means, and bidirectional solid state switching means connecting the main storage capacitor for discharge through the lamp, the constants of the circuit being so selected that both of said bidirectional solid state switching means conduct between 75 and 105 degrees of each half cycle, whereby the capacitor is discharged into the lamp in a high rate rise time current pulse.

2. An electric system according to claim 1 in which means is provided controlling the solid state switching means by high frequency pulses applied across the series connected discharge lamp and switching means.

3. An electric system according to claim 1 in which means is provided controlling the solid state switching means by the capacitor voltage.

4. An electric system according to claim 1 in which means is provided controlling the solid state switching means by the alternating current supply voltage.

5. An electric system according to claim 1 in which the means for ionizing the lamp is high frequency pulse producing means.

6. An electric system according to claim 5 in which adjustable phase control means is provided for the high frequency pulse producing means.

7. An electric system according to claim 5 in which a by-pass capacitor is connected in the discharge lamp side of the solid state switching means so that said switching means is unaffected by said high frequency pulse producing means.

8. An electrical system according to claim 1 in which the solid state switching means is a bidirectional diode thyristor.

9. An electrical system according to claim 1 in which the solid state switching means is a controlled rectifier.

10. An electrical system according to claim 1 in which the means for ionizing the gas in the lamp is a starting circuit, and the starting circuit is transformer coupled to the operating circuit.

11. An electric system according to claim 1 in which thet means for ionizing the gas in the lamp is a starting circuit, and the starting circuit is capacitively coupled to the operating circuit.

12. An electric system according to claim 1 in which a third electrode is provided for the discharge tube, and the means for ionizing the gas in the lamp is a starting circuit, the starting circuit being coupled to the third electrode.

13. An electric system according to claim 1 in which the main capacitor is connected in series with the discharge lamp.

14. An electric system according to claim 1 in which the main capacitor is connected in parallel with the discharge lamp.

15. An electric system according to claim 1 in which the means for ionizing the lamp is high frequency pulse producing means, and phase control means is provided for controlling the solid state switching means.

16. An electric system according to claim 1 in which the solid state switching means is a gate controlled thyristor.

References Cited

UNITED STATES PATENTS

| | | | |
|---|---|---|---|
| 3,310,687 | 3/1967 | Howell | 307—88.5 |
| 3,353,085 | 11/1967 | Morgan | 321—43 |

JOHN W. HUCKERT, Primary Examiner

B. ESTRIN, Assistant Examiner

U.S. Cl. X.R.

307—305; 315—240, 241, 335